United States Patent [19]
Da Costa et al.

[11] 3,927,559
[45] Dec. 23, 1975

[54] TORQUE MEASURING MEANS FOR MINIATURE WATCH MOTORS OR THE LIKE

[75] Inventors: Harry Da Costa; Victor W. Foster, both of Scottsdale, Ariz.

[73] Assignee: Motorola, Inc., Chicago, Ill.

[22] Filed: Nov. 13, 1974

[21] Appl. No.: 523,287

[52] U.S. Cl. ................................................ 73/134
[51] Int. Cl.² ........................................ G01L 3/18
[58] Field of Search ...................... 73/116, 134, 135

[56] References Cited
UNITED STATES PATENTS

| | | | |
|---|---|---|---|
| 2,493,758 | 1/1950 | Friedrich | 73/134 |
| 2,509,743 | 5/1950 | Olinger | 73/116 |
| 2,579,804 | 12/1951 | Dotson | 73/135 X |
| 3,116,634 | 1/1964 | Grabovac | 73/134 |

Primary Examiner—Charles A. Ruehl
Attorney, Agent, or Firm—Harry M. Weiss; Willis E. Higgins; Michael D. Bingham

[57] ABSTRACT

This disclosure is directed to a mechanical system for measuring the torque of miniature watch motors or the like. A box-like structure of an optically clear material containing a motor coupling mechanism and a mechanism for measuring the torque of a watch motor is attached to a pedestal that includes a mechanism for introducing electrical power to the test motor. The box structure which contains the torque test mechanism is pivoted from a second pedestal attached to a base plate in such a manner that the motor attachment face of the box structure can be set in an up or inverted position, while the motor under test is operating. A mirror is located under the box structure so that the operator can observe the torque characteristic of the motor by observing the amount of deflection of a pointer attached to the torque measuring unit when the box containing the test mechanism is in the inverted position.

17 Claims, 9 Drawing Figures

TORQUE MEASURING MEANS FOR MINIATURE WATCH MOTORS OR THE LIKE

BACKGROUND OF THE INVENTION

The invention relates to an apparatus and method of testing miniature watch motors or the like and, more particularly, to an apparatus for testing watch motors for their torque characteristic.

In the production of miniature motors, a problem arises as the torque characteristics of the motors are to be tested. Because the magnitude of the torque to be measured is infinitesmally small, the moment of inertia of the components in a drive chain between a motor and a torque measuring unit is critical. To accurately measure the torque of such miniature motors, the testing apparatus must be efficient and accurate, therefore, subminiaturization of the drive mechanism is required.

A need exists to provide an apparatus and method for efficiently and accurately measuring watch motor performance.

SUMMARY OF THE INVENTION

Accordingly, it is an object of this invention to provide an apparatus for measuring the torque characteristics of miniature motors.

It is another object of this invention to provide an apparatus suitable for measuring the torque of watch motors.

It is a still further object of this invention to provide an apparatus capable of accurately and efficiently indicating the effects of significant changes in the magnetic detent strength of watch motors.

It is yet another object of this invention to provide an apparatus and method thereof capable of accurately and efficiently measuring torque in the micro-ounce inch range.

Another object of this invention is to provide an apparatus for measuring the torque of watch motors which is capable of accepting and testing motors with leads projecting from either the front or rear faces of the motor.

An apparatus and method is provided suitable for measuring the torque characteristics of small watch motors. Moreover, the apparatus is suitable for accepting and testing such motors with leads projecting from either the front or rear faces of the motor. The apparatus includes a box-like structure made of an optically clear material having a ledge which is formed by an extension of the bottom surface of the box structure. A pedestal is attached to the ledge to which the mechanism for introducing electrical power to the motor under test is connected thereto. The box-like structure contains a motor coupling mechanism and a mechanism for measuring the torque of the watch motor and is pivoted from a second pedestal attached to a base plate in such a manner that the motor attachment face of the box structure can be set in an up or in an inverted position while the motor under test is operating. A mirror is located under the box structure so that an operator can observe the torque of the motor when the box containing the test mechanism is in the inverted position. In one embodiment of the invention, a motor with leads projecting from the back face is placed in a fixture with the long end of the motor axle engaging a drive collet, and the motor leads placed in contact with the mechanism for introducing the electrical power to the test motor. In a second embodiment of the invention, a motor with leads projecting from the same face as the operating portion of the motor axle is placed in a fixture with the long end of the axle engaging the drive collet and the two motor leads inserted into insulated sleeves. An auxiliary member is attached to the electrical contacting mechanism and positioned above the motor so that rubber pads attached to the auxiliary member will hold the motor securely for testing. In either embodiment, the operator presses a coupling plunger and effects maximum engagement of the coupling mechanism to the motor axle. Upon release of the coupling plunger, the motor will commence to operate and wind up a dual hair spring, which in turn rotates a pointer mounted above a calibrated dial plate. The operator observes the motion of the pointer to determine if the motor is an acceptable product. The torque test is performed with the motor in both the up position and the inverted position to check the effects of friction caused by the front and rear motor bearings with respect to motor performance.

DETAILED DESCRIPTION OF THE PREFERRED EMBODIMENTS

Figure 1:
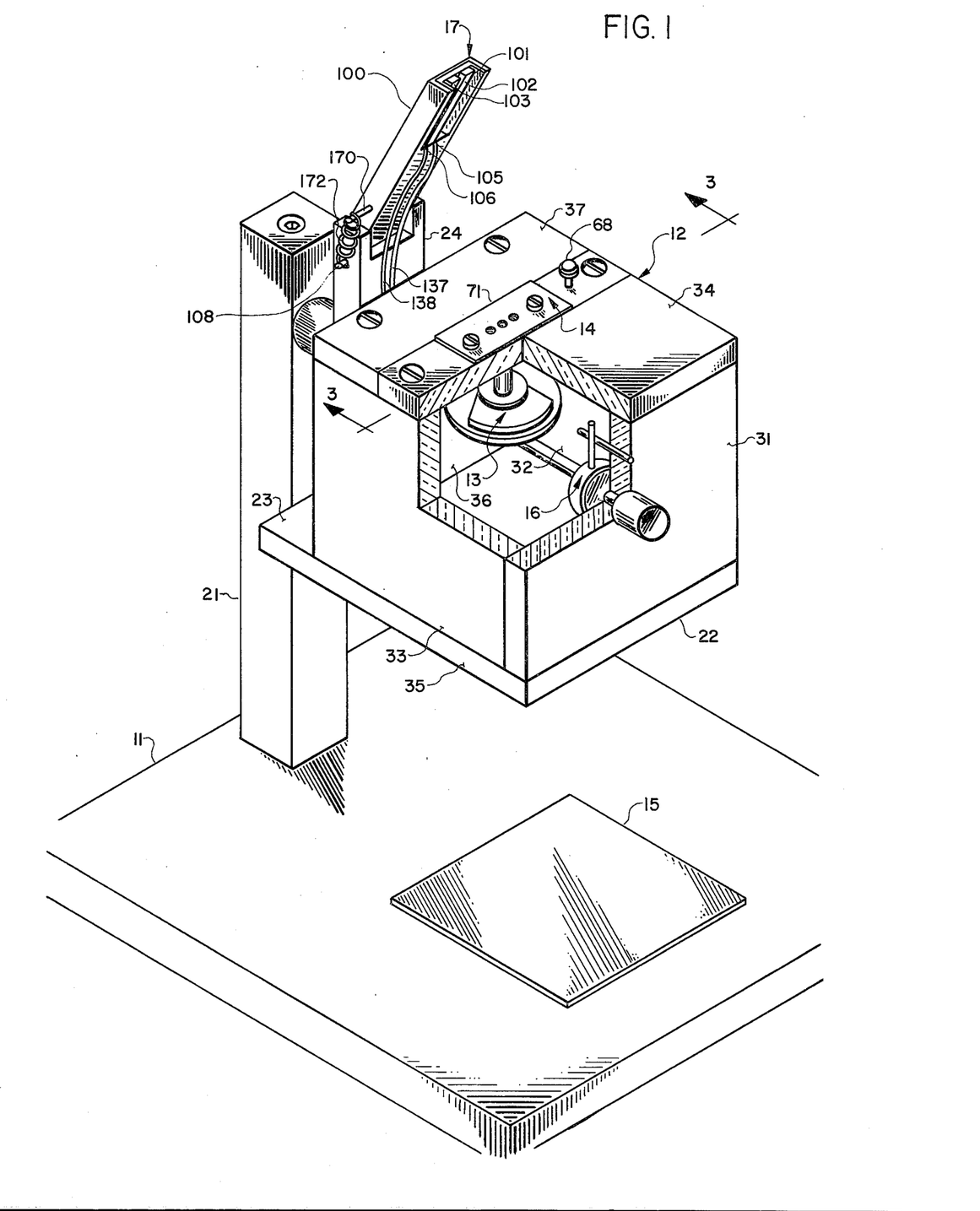
FIG. 1 presents a full size perspective view, somewhat fragmentary, of the test apparatus.

Referring to FIG. 1, the invention consists of base plate 11, square in shape, to which is attached vertical pedestal member 21. Box-like structure 12 containing the mechanism for measuring the torque of miniature watch motors is attached to vertical post member 21 in a manner to permit 180° rotation of the measuring system for testing motors in an up or inverted position.

Box-like structure 12 is made from an optically clear plastic material such as acrylic and is constructed in two sections to permit the servicing of torque mechanism 13 and motor coupling mechanism 14 contained on or within the box structure. Located in the forward or front face of box structure 12 is pointer limiter 16. Pointer limiter 16 limits pointer rotational travel for either clockwise or counter-clockwise operating watch motors.

Mounted to extending or shelf-like portion 23 of the bottom surface of box structure 12 is pedestal 24. Attached to the upper end of pedestal 24 is electrical contacting mechanism 17.

Attached to the surface of base plate 11 and located forward of leading edge 22 of box structure 12 is mirror 15 whose purpose is to display, to the test operator, the dial of torque mechanism 13 when the test unit is in the inverted position.

Figure 7:
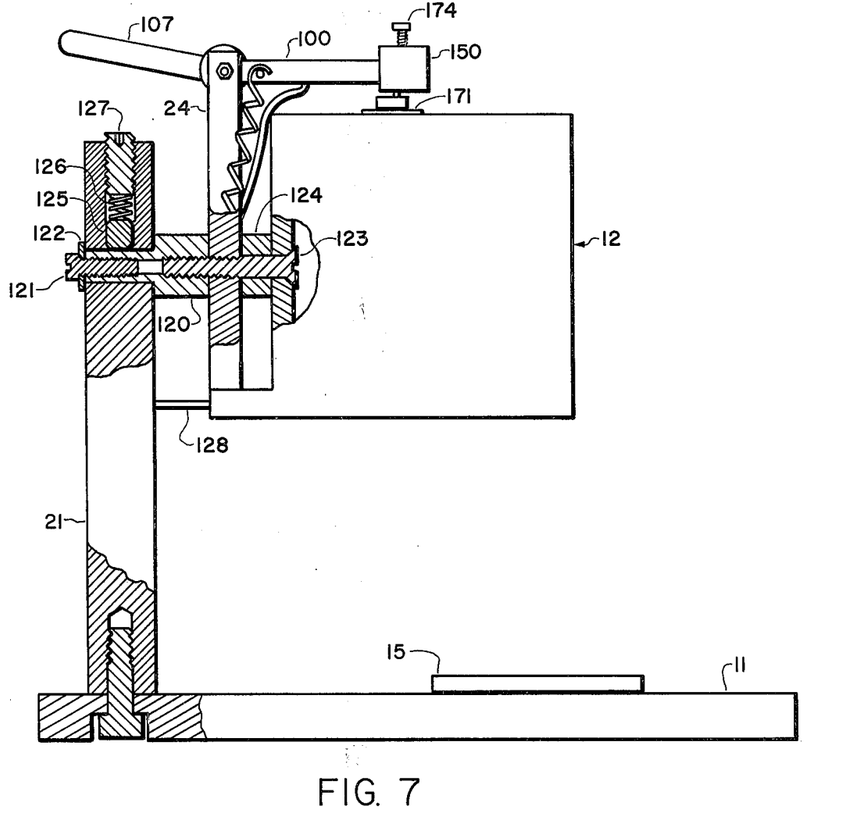
FIG. 7 is an elevation view, somewhat fragmentary, of the test apparatus.

Referring to FIG. 1 and FIG. 7, box structure 12 is comprised of two sections, with the front section including panels 31, 32, 33 and 34; and the back section including panels 35, 36, and 37. The panels are secured together with a suitable acrylic adhesive.

The motor coupling mechanism 14 (FIGS. 1, 2, 3 and 4) includes base member 41, rectangular in shape, having holes 42 and 43 at its extremities to accept attachment screws. Attached to bottom surface 44 of base member 41 is pedestal member 45, one end of which is made with reduced section 46 and the other end provided with flange 47. Mid-section 48 of pedestal member 45 is partially removed to accept priming arm 49; and is constructed with a cylindrical bore 50, the bore adjacent to flange 47 being larger than the bore at reduced section 46. Provided in flange 47 are holes 51 and 52 for mounting torque mechanism 13 and a hole 53 for oiling purposes.

Figure 2:
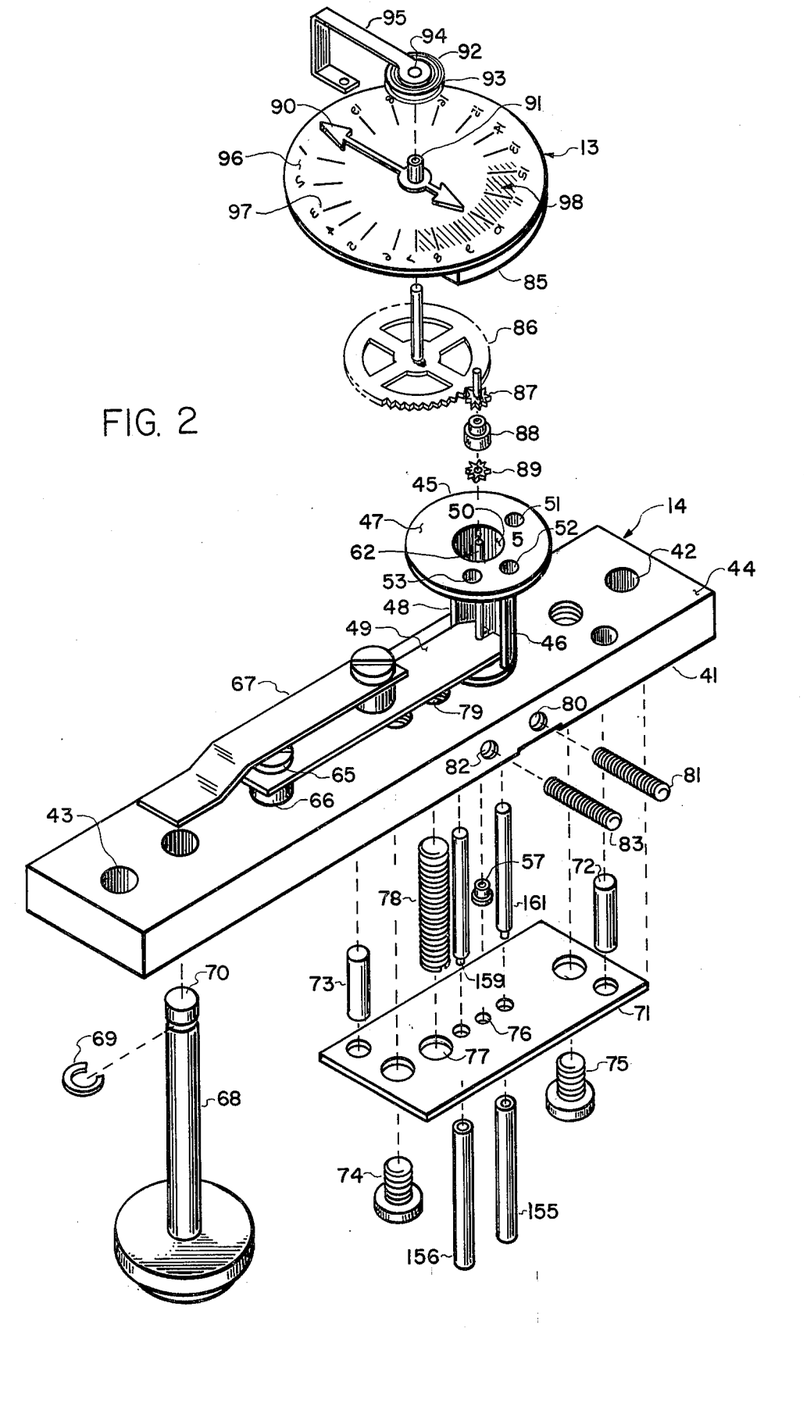
FIG. 2 is an enlarged and inverted perspective view of the coupling and torque measuring mechanism.

Base member 41 is made with a shallow counter-bore 54 on the top face and a deeper counter-bore 55 on the bottom face, with the two counter-bores connected by a central hole 56 sized to clear collet member 57. Collet member 57 (FIG. 4), somewhat cylindrical in shape, is made with a slot or notch 58 at one end and flange 59 at the other end. A second slot 61 is provided adjacent to the underside of flange 59 to accept drive spring 60. Collet member 57 has a cylindrical bore with the drive spring end of the bore sized to accept the watch motor axle, the other end of the bore being somewhat larger for general clearance purposes. Attached to collet member 57 is drive shaft 62, the T-shaped end 63 of which fits into slot 58 of collet member 57. Located about drive shaft 62 is priming spacer 64 which is located between the projections of T-shaped end 63 of drive shaft 62 and priming arm 49 (FIG. 2). Priming arm 49 made of a spring quality material such as beryllium copper is attached to base member 41 with screw 65 and spacer 66.

Figure 4:
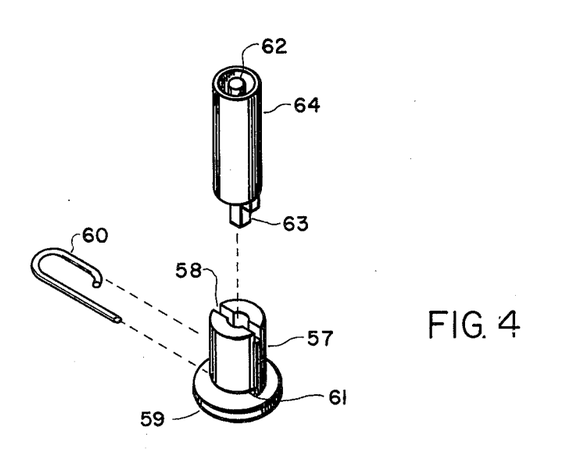
FIG. 4 is an enlarged exploded perspective view of the basic coupling mechanism.

Attached to priming arm 49, at about its mid-point, is release arm 67, with attachment being effected by a screw, spacer, and a nut. Release arm 67 is also made from a spring quality material such as beryllium copper or the like.

Mounted through base member 41 is plunger 68, containment of which is effected by safety wire 69. When plunger 68 is depressed, the smaller end 70 pushes against release arm 67 which in turn moves priming arm 49, thus raising collet member 57. Provided in base member 41 is tapped hole 79 to receive priming arm adjusting screw 78, tapped hole 80 receives pedestal member locking screw 81, and tapped hole 82 receives priming arm adjustment locking screw 83. Motor coupling mechanism 14 comprising collet member 57, drive spring 60, drive shaft 62, and priming spacer 64 are contained in base member 41 by the attachment of top plate 71. Top plate 71 is aligned by dowel pins 72 and 73 and screws 74 and 75. Hole 76 is provided in top plate 71 for cleaning the motor drive shaft and hole 77 is provided to clear priming arm adjusting screw 78.

Referring to the upper portion of FIG. 2, torque mechanism 13 comprises a stripdown mechanical watch movement with sweep second wheel 86 and escape wheel pinion 87 (including a shaft) being the retained moving parts. Attached to the lower or outward end of escape wheel pinion 87 is movement drive member 88 so proportioned that it will accept and engage drive gear 89 which is mounted on drive shaft 62.

Attached to the upper or inboard end of sweep second wheel 86 is sweep second hand 90 which is provided with boss 91 sized to fit snugly with a collar attached to the innermost portion of the hair spring which comprises the lower part of dual hair spring assembly 92. The outboard extremities of the two hair springs are bent and twisted together with resultant joint 93 being secured with a suitable contact cement. The collar attached to the innermost portion of the upper section of dual hair spring assembly 92 is snugly secured to stud 94 which comprises a part of hair spring fixed arm 95. Hair spring fixed arm 95 is secured to mechanical watch movement 85 with original screws, with torque mechanism assembly 13 being attached to pedestal member 45 in a similar manner.

Attached to the face of mechanical watch movement 85 is dial plate 96 which is divided into 20 equal segments, each segment being marked with a line and a number shown by reference numeral 97. The inverted members are mirror imaged with shaded zone 98 provided for reject motor performance limits.

Referring to FIGS. 1, 3, 5 and 6, electrical contacting mechanism 17 is seen to comprise of contact arm member 100 made from a suitable electrical insulating material such as phenolic. Located at one end of contacting mechanism 17 is recessed area 101 for the containment of contacts 102 and 103 and a traverse hole at the other end for arm pivot means 104. Electrical contacts 102 and 103, which are made from a suitable spring quality material such as beryllium copper, are perforated with an attachment hole, not shown, for securing the contacts to contact arm member 100. A smaller hole in turn-down portion 105 or 106 of contacts 102 and 103 for the attachment of signal leads 137 and 138. Pin 170 (FIG. 5) is mounted traversely and adjacent to pivot means 104 for the attachment of spring 172 and to form a stop for arm member 107. The other end of spring 172 is attached to pin 108 mounted in pedestal 24. Contact arm member 100 with associated assembled components is installed in notched section 109 of pedestal 24 with securement being effected by pivot pin 104 threaded at one end to receive lock-nut 110 and threaded at the other end to receive washer 111 and lock nuts 112 and 113.

Figure 5:
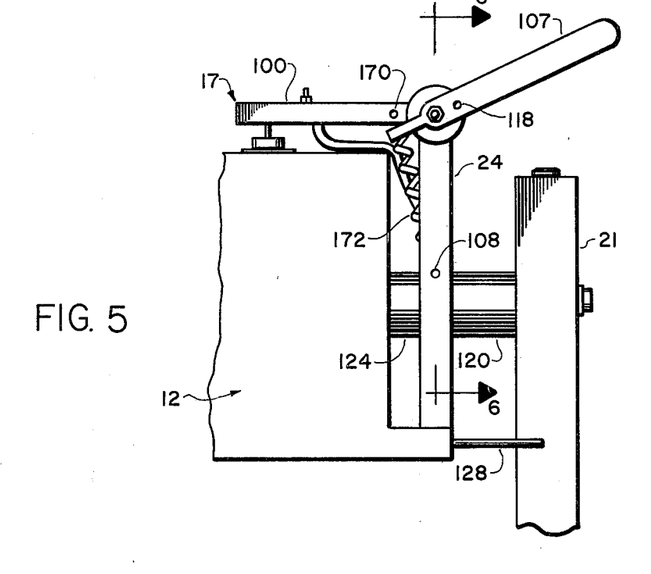
FIG. 5 is an elevation view of the motor contacting mechanism.
Figure 6:
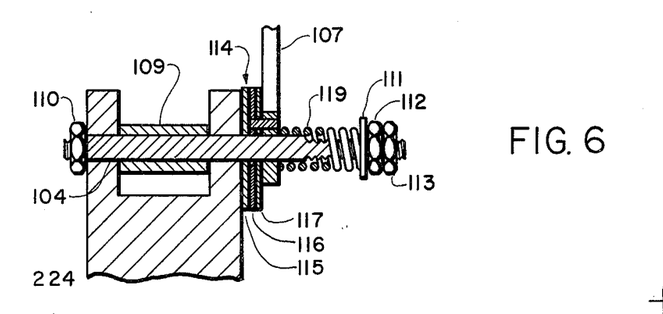
FIG. 6 is a sectional view of the motor contacting mechanism, taken in the direction of arrows 6—6 of FIG. 5.

Arm member 107 and the assembled contact arm member 100 are connected by means of a simple spring loaded clutch mechanism 114, consisting of plain nickel plated brass washer 115; fibre washer 116 and nickel plated brass washer 117 with both members drilled to receive drive pin 118 which is mounted in the aforementioned drill members 116 and 117 and also inserted into a matching hole in arm member 107, spring 119 located about the arm pivot 104; with clutch force being determined by the adjustment of locking nuts 112 and 113.

Referring to FIG. 7, structure 12 which comprises the means for testing the watch motors is pivoted from vertical post like member 21. The pivoting means includes nickel plated brass brushing 120 tapped at one end to receive locking screw 121 and washer 122; and tapped at the other end to receive flat head brass screw 123 which is recessed into back panel 36 of box-like structure 12. Box structure 12 is separated from pedestal member 24 by spacer 124 with screw 123 holding items 12, 24 and 120 in rigid relationship. Mounted in vertical post member 21 is a means of providing an adjustable rotational friction component for the test mechanism. This means consists of nylon, or similar material, thrust pad 125, spring 126, and adjusting screw 127 with thrust pad 125 being loaded against a shank portion of bushing 120. Stop 128 is provided in box structure 12 to prevent overshoot of the test mechanism in the inverted position.

Figure 8:
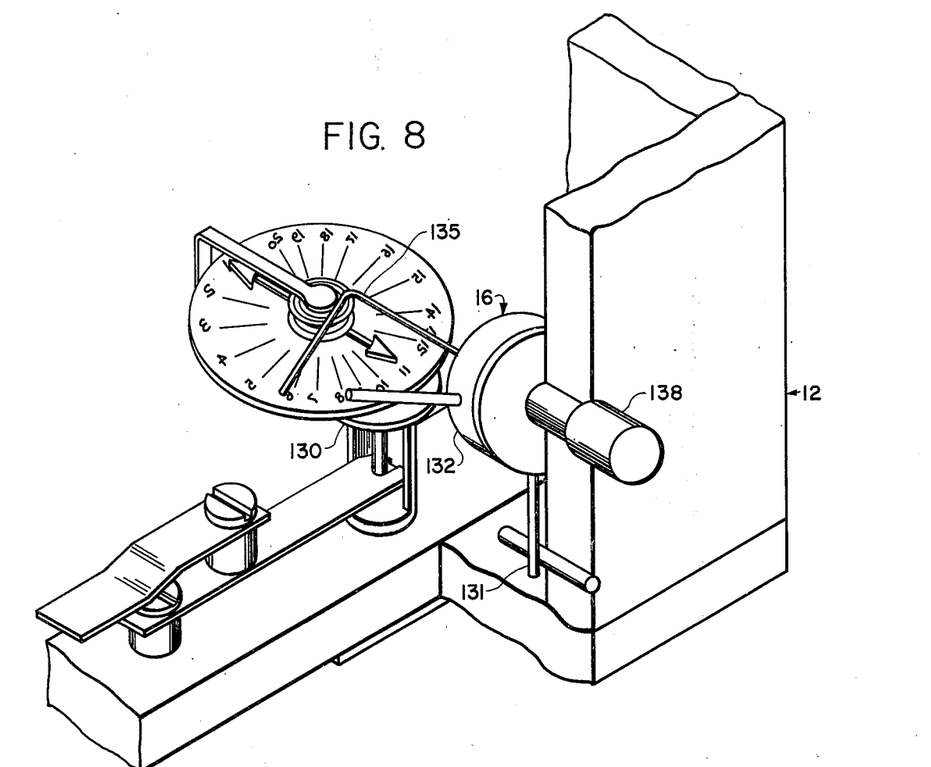
FIG. 8 is a perspective view of the torque and pointer limiting mechanism.
Figure 9:
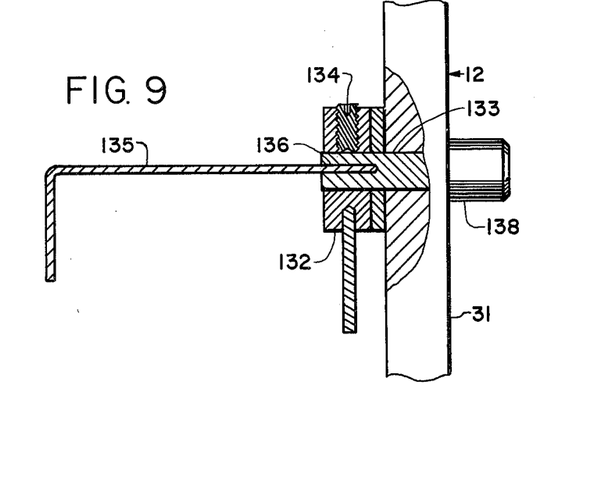
FIG. 9 is a sectional view of the pointer limiting mechanism.

Referring to FIGS. 8 and 9, pointer limiting mechanism 16 including shoulder plug 138 inserted through hole 133 in clear plastic box panel 31, with felt washer 129 placed about the shank of shoulder plug 138 and secured by drive collar 132. Inserted into drive collar 132 are two pins, 130 and 131, press fitted into holes provided in the periphery of drive collar 132 together with lock screw 134 for attachment to plug 128.

Right angle bent wire 135 is inserted (force fitted) into hole 136 in drive collar 132 to form the torque meter stop. For clockwise motors, the knob of shoulder plug 138 is rotated counter-clockwise until the stop is located around the numeral 5 on dial plate 96 (FIG. 8 shows the stop in this position); and conversely, for counter-clockwise motors, the knob of shoulder plug 128 is rotated clockwise until the stop is located about the numeral 15 on dial plate 96.

Figure 3:
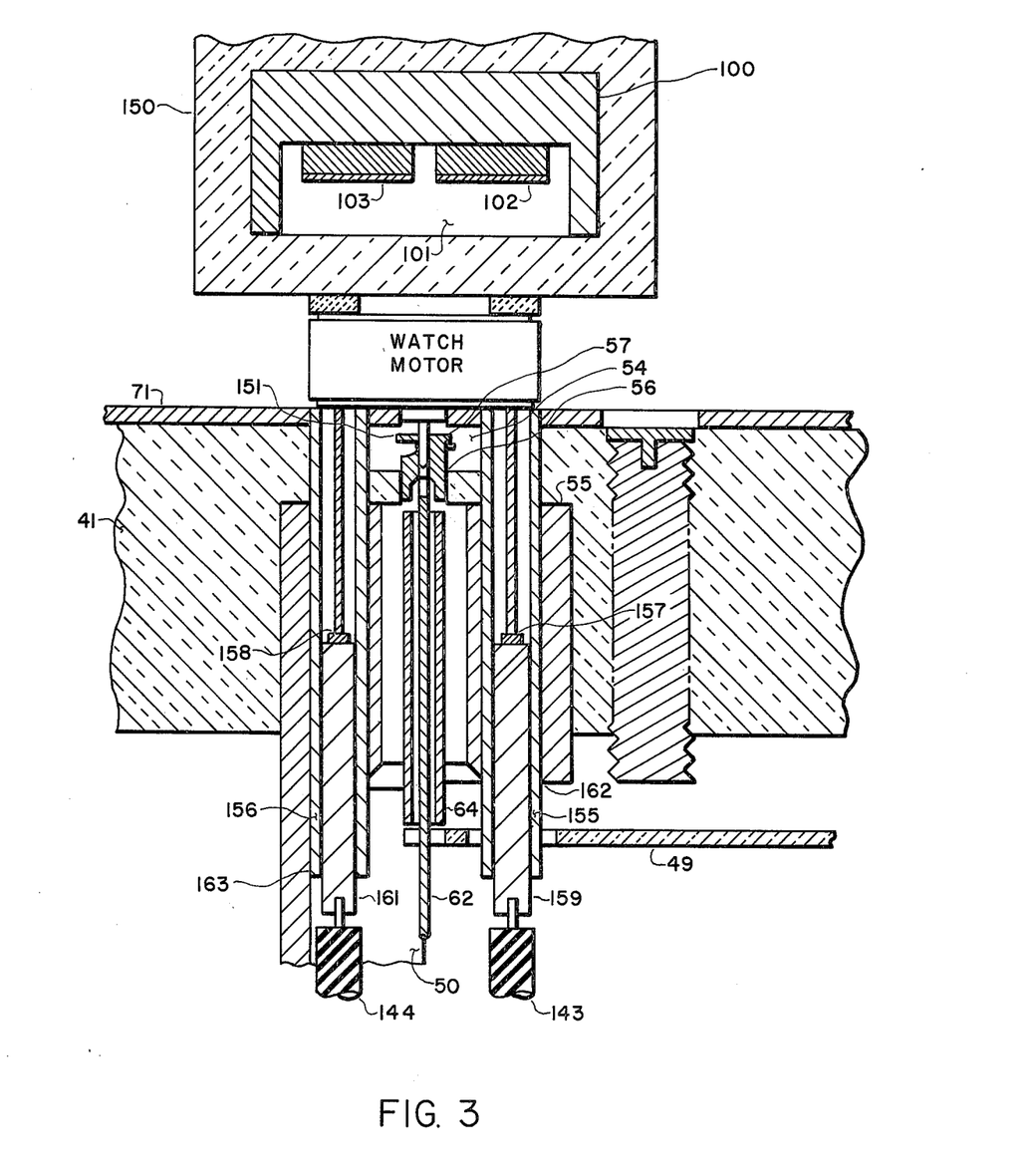
FIG. 3 is an enlarged cross-sectional view of the electrical contacting and coupling mechanism with a motor installed for test taken in the direction of arrows 3—3 of FIG. 1.

Included with coupling mechanism 14 is a system for accepting and testing motors with leads projecting from the same face as the long end of the motor axle. Referring to FIG. 2 and FIG. 3, the system is shown to comprise insulated sleeves 155, 156 tightly fitted into holes 162 and 163 located in reduced section 46 of pedestal member 45, with one end of insulated sleeves 155 and 156 projecting from the end of pedestal member 45 through clearance holes in base member 41 and top plate 71. Fitted into the bore of insulated sleeves 155 and 156 are pin assemblies 159 and 161 (force fitted) with spring loaded upper ends 157 and 158 intended to make electrical contact with the motor leads. Soldered to the lower end of pin assemblies 159 and 161 are insulated wires 143 and 144 which are routed through the rear panel of box structure 12, and joined to similar wires from electrical contacting mechanism 17.

In operation of the test fixture, a power source suitable for driving miniature watch motors is attached to the leads from electrical contact mechanism 17 and a watch motor is installed by inserting the long end of the motor axle into the hole 76 located in the top plate 71 which forms part of motor coupling mechanism 14. During the aforementioined operation, contact arm 100 of electrical contact mechanism 17 is in the up or load position. After the watch motor is installed, contact arm member 100 with associated contacts 102 and 103 is lowered onto the motor contacts by raising arm member 107 into the vertical position. The next operation is to reset the coupling device so that effective attachment of the motor to the torque measuring mechanism 13 is obtained. This procedure is accomplished by depressing coupling plunger 68 which deflects the release arm 67 and, as release arm 67 is attached to priming arm 49, priming arm 49 is raised, lifting sleeve 64 and collet member 57.

This vertical motion of collet member 57 does in effect produce the maximum engagement of the motor axle into the collet, yet allows some operating clearance, 151, as the motor's rotor/axle assembly will drop back by the amount of the axial play in the motor.

Upon release of coupling plunger 68, the test motor is allowed to operate the torque measuring mechanism which displays to the operator the amount of energy extended in winding up dual hair spring 92. This is indicated as the graduation number that pointer 90 will reach at the stalling point of the motor. A shaded reject zone 143 is provided for ease of opertion. The torque test is performed either with the motor in the vertical or up position or with the motor in the inverted or down position. If the motor is in the inverted or down position, the operator reads off the torque number in mirrow 15, attached to base plate 11. The aforementioned test is intended for motors with leads projecting from the rear face or short axle end of the motor. Motors with leads projecting from the front face are tested as above except an auxiliary member 150 (FIG. 3) is attached to electrical contacting mechanism 17 and locked into position with screw 174 (see FIG. 7). The motor to be tested is installed on the test fixture with its leads and long axle inserted into the appropriate holes in top plate 71, and testing is conducted as previously described.

While the invention has been particularly shown and described in reference to the preferred embodiments thereof, it will be understood by those skilled in the art that changes in form and details may be made therein without departing from the spirit and scope of the invention.

What is claimed is:

1. An apparatus for measuring the torque of a miniature motor or the like, the motor having an axle, which comprises:

a base plate;

a first pedestal member attached to said base plate;

a transparent box-like structure pivotally mounted to said first pedestal;

means for measuring and visually indicating the torque of said miniature motor, said torque indicating means being disposed within said box-like structure;

means engaging said torque indicating means for operatively coupling said miniature motor to said torque indicating means such that substantially no radial and axial load forces are applied to said miniature motor, said coupling means being attached to and disposed within said box-like structure, said coupling means being attached to said torque indicating means; and means for electrically connecting said miniature motor to an external power source.

2. The apparatus as defined in claim 1, wherein said torque indicating means includes:

torque visual display means for visually displaying the torque characteristic of said miniature motor;

a movement drive member responsive to said coupling means for imparting a rotational movement;

a wheel pinion responsive to said rotational movement imparted by said movement drive member; and a gear wheel responsive to the rotation of said wheel pinion for translating said movement to said torque visual display means.

3. The apparatus of claim 2, wherein said torque visual display means includes:

a mechanical watch movement member having a dial face, said dial face being segregated into a number of equal segments;

a sweep hand including a boss member, said boss member having a longitudinal bore;

means attached to said boss member of said sweep hand for imparting rotational bias to said sweep hand in response to said rotational movement of said gear wheel; and a longitudinal shaft traversely mounted on said gear wheel, said longitudinal shaft being disposed within said longitudinal bore of said boss member of said sweep hand.

4. The apparatus of claim 3, wherein said bias means includes:

a first hair spring;

a second hair spring integrally connected with said first hair spring;

a collar attached to the innermost portion of said first hair spring and to said sweep hand;

a mounting arm fixedly mounted to said mechanical watch movement member; and said second hair spring connected to said mounting arm.

5. The apparatus as defined in claim 2 wherein said coupling means includes:

a base member mounted to said box-like structure having a top and bottom surface, said top surface having a first counterbore, said bottom surface having a second counterbore, said second counterbore being larger in diameter than said first counterbore and said first counterbore communicating with said second counterbore;

a cylindrical pedestal member having a longitudinal bore, said pedestal being disposed in said second counterbore of said base member, said pedestal member having a flange at its end that is displaced from said base member and its midsection partially removed, said bore adjacent to said flange being larger in diameter than said bore at the end of said pedestal member; and drive means disposed within said longitudinal bore of said pedestal member for engaging the axle of said miniature motor and driving said movement drive member.

6. The apparatus of claim 5, wherein said drive means includes:

a cylindrical collet member to which a drive shaft is connected, said collet member being mounted in a guideway between said first counterbore and said second counterbore of said base member, said collet member having a cylindrical bore which accepts the axle of said miniature motor;

said cylindrical collet member having a first slot at one end and a flange at its other end; and priming means connected to said drive means and mounted to said bottom surface of said base member for alternately engaging and disengaging said drive means to the axle of said miniature motor.

7. The apparatus of claim 6 wherein said drive shaft includes:

a T-shaped end portion fitting into said slot of said collet member;

said collet member further including a second slot adjacent to the underside of said flanged end of said collet member; and a drive spring mounted about said second slot of said collet member.

8. The apparatus of claim 7 wherein said priming means includes:

a priming arm connected to said drive shaft of said drive means and attached to said bottom surface of said second base member;

a release arm attached to said priming arm at approximately mid-point of said priming arm; and a plunger mounted through said second base member for deflecting said release arm so that said collet member is disengaged from said miniature motor.

9. The apparatus of claim 8 wherein:

said miniature motor is mounted onto an outside horizontal surface of said box-like structure and engages said coupling means therein;

said connecting means coupling said miniature motor to an external power source includes a second pedestal mounted to said box-like structure, said second pedestal being parallel to a vertical surface of said box-like structure;

a contact arm member pivotally connected to said second pedestal;

a pair of insulated sleeves mounted through saaid base member, said pair of insulated sleeves being located in said cylindrical pedestal member and projecting therefrom;

a pair of pin assemblies, each of said pin assemblies fitted into the respective bore of said pair of insulated sleeves, said pair of pin assemblies having a spring-loaded upper end for making electrical contact with the motor leads;

a pair of insulated wires, each of said insulated wires being respectively soldered to said pin assemblies and being adapted to be connected to said external power source; and means for alternately engaging or disengaging said contact arm to said miniature motor whereby said motor leads make electrical contact to said pair of pin assemblies for coupling power to said miniature motor.

10. The apparatus of claim 1, wherein said box-like structure includes:

said miniature motor being mounted onto an outside horizontal surface of said box-like structure, said miniature motor engaging said coupling means therein; and a mirror attached to said base plate for viewing said torque indicating means when said holding means is in an inverted position.

11. The apparatus of claim 10 wherein said torque indicating means further includes:

a torque visual display means for visually displaying the torque characteristics of said miniature motor, said torque visual display means including a sweep hand; and means mounted to one of the vertical surface a of said box-like structure for limiting the rotational travel of said sweep hand.

12. The apparatus of claim 11 wherein said limiting means further include:

a shouldered rod mounted through said vertical surface of said box-like structure having a headed end with said headed end adjacent to the outside surface of said vertical surface of said box-like structure;

a drive collar located about said shouldered rod, said drive collar being fixedly mounted to said shoulder rod;

a pair of dowel pins transversely mounted into the periphery of said drive collar;

a wire inserted into the opposite end of said shoulder rod, said wire having a right angle bend at its other end and extending above the surface of said dial face; and means embedded in said vertical surface of said box-like structure to alternately make contact with said pair of dowel pins for providing a travel stop for said right angle bend portion of said wire.

13. The apparatus of claim 10 wherein said connecting means coupling said miniature motor to an external power source includes:

a second pedestal mounted to said box-like structure, said second pedestal being parallel a vertical surface of said box-like structure;

a contact arm member pivotally connected to said second pedestal;

a pair of electrical contacts secured to said contact arm, each of said electrical contacts having an electrical lead adapted to be connected to an external power source; and means for alternately engaging and disengaging said contact arm to said miniature motor whereby said pair of electrical contacts couple power to said miniature motor.

14. An apparatus for measuring the torque characteristics of watch motors, the motor leads being either projecting from the back face of the motor opposed to the motor axle or projecting from the same face as said motor axle, which comprises:

a base plate;

a first pedestal attached to said base plate;

a transparent box-like structure pivotally mounted to said first pedestal;

a base member mounted to said box-like structure and having a top and bottom surface, said top surface having a first counter bore, said bottom surface having a second counter bore, said second counter bore being larger in diameter than said first counter bore, said first counter bore communicating with said second counter bore;

a cylindrical pedestal member having a longitudinal bore, said pedestal member being disposed within said second counterbore of said base member, said pedestal member having a flange at its end which is displaced from said base member and its mid-section partially removed, and said bore adjacent to said flange being larger in diameter than said bore at the end of said pedestal member;

a cylindrical collet member to which a drive shaft is connected, said collet member being mounted in a guideway between said first counterbore and said second counterbore of said base member, said collet member having a cylindrical bore for accepting said axle of said watch motor;

said cylindrical collet member having a first slot at one end and a flange at its other end;

said drive shaft having a T-shaped end portion for fitting into said slot of said collet member;

said collet member further including a second slot adjacent to the underside of said flange end of said collet member;

a drive spring mounted about said second slot of said collet member;

a priming arm connected to said drive shaft and attached to said bottom surface of said base member;

a release arm attached to said priming arm at approximately midpoint of said priming arm;

a plunger mounted in said second base member for deflecting said release arm so that said collet member is disengaged from said watch motor;

a drive gear mounted on said drive shaft;

a movement drive member connected to said drive gear for imparting a rotational movement in response to said movement of said drive shaft;

a wheel pinion responsive to said rotational movement;

torque indicator means for visually displaying the torque characteristics of said watch motor; and a gear wheel responsive to the rotation of said wheel pinion for translating said movement to said torque indicator means.

15. The apparatus of claim 14, wherein said torque indicator means includes:

a mechanical watch movement member having a dial face, said dial face being segregated into a number of equal segments;

a sweep hand including a boss member, said boss member having a longitudinal bore;

means attached to said boss member of said sweep hand for imparting rotational bias to said sweep hand in response to said rotational movement of said gear wheel; and a longitudinal shaft on said gear wheel, said longitudinal shaft being traversely mounted on said gear wheel and fitted within said longitudinal bore of said boss member of said sweep hand.

16. The apparatus of claim 15 wherein said bias means includes:

a first hair spring;

a second hair spring integrally connected with said first hair spring;

a collar attached to the innermost portion of said first hair spring and to said sweep hand;

a mounting arm securely fastened to said mechanical watch movement member; and said second hair spring being connected to said mounting arm.

17. The apparatus of claim 16 wherein said connecting means coupling said watch motor to an external power source includes:

a second pedestal mounted to said box-like structure, said second pedestal being parallel to a vertical surface of said box-like structure;

a contact arm member pivotally connected to said second pedestal;

a pair of electrical contacts secured to said contact arm, each of said electrical contacts having an electrical lead adapted to be connected to an external power source; and means for alternately engaging and disengaging said contact arm to said watch motor whereby said pair of electrical contacts couple power to said watch motor.

* * * * *